United States Patent [19]

Noakes et al.

[11] Patent Number: 4,507,226
[45] Date of Patent: Mar. 26, 1985

[54] RADIOCHROMIC LIQUID SOLUTION

[75] Inventors: John E. Noakes, Athens, Ga.; Randolph A. Culp, Lyndhurst, Ohio

[73] Assignee: Bicron Corporation, Newbury, Ohio

[21] Appl. No.: 353,813

[22] Filed: Mar. 2, 1982

Related U.S. Application Data

[63] Continuation-in-part of Ser. No. 172,250, Jul. 25, 1980.

[51] Int. Cl.³ ............................................. G01N 21/00
[52] U.S. Cl. .................................. 252/600; 430/335; 430/338; 250/474.1; 252/408.1
[58] Field of Search ........................... 252/600, 408.1; 430/335–338; 250/474.1

[56] References Cited

U.S. PATENT DOCUMENTS

| Re. 30,797 | 11/1981 | Davis | 101/DIG. 1 |
| 3,909,266 | 9/1975 | Inoue et al. | 430/335 |
| 4,006,023 | 2/1977 | McLaughlin et al. | 430/338 |
| 4,377,751 | 3/1983 | Kronenberg et al. | 250/474.1 |

OTHER PUBLICATIONS

El-Assy et al., Inter. J. Appl. Rad. Isot., vol. 33, pp. 641–645, (8–1982).

Primary Examiner—Ben R. Padgett
Assistant Examiner—M. Moskowitz
Attorney, Agent, or Firm—Pearne, Gordon, Sessions, McCoy, Granger & Tilberry

[57] ABSTRACT

A solution of a hydrophobic substituted, amino triphenyl methane leucocyanide dye in a clear, highly polar solvent free of hydroxyl groups with enough acid added to make the solution slightly acidic which is sensitive to small dosages of ionizing radiation and responds by permanently changing color. Up to one-half of the solution by weight can be replaced by a second solution of an aromatic solvent and an organic fluor. Another modification of the invention is a solution of a leucocyanide dye in a clear polar solvent which has an aromatic group, an organic fluor, and enough acid to make the solution slightly acidic.

11 Claims, No Drawings

RADIOCHROMIC LIQUID SOLUTION

This application is a continuation-in-part of application Ser. No. 172,250, filed July 25, 1980.

This invention relates to a radiochromic liquid solution which is particularly sensitive to ionizing radiation of less than 1000 rads and which, upon exposure to such radiation, responds by permanently changing from a clear solution to a colored solution.

The problem with most devices and compounds for measuring ionizing radiation of less than 1000 rads is that they are not sensitive enough or they cost too much, or both. In monitoring the exposure of personnel during a nuclear war or nuclear disaster, for instance, readings have to be provided in a range of from about 20 rads to about 1000 rads. A "rad" is a unit of absorbed radiation dosage equal to the delivery of 0.01 joules per kilogram of human body material. A dosage of 1000 rads is lethal. A dosage of 600 rads can be lethal to perhaps fifty percent of the population exposed to the dosage. A dosage of 200 rads is not lethal. It is obviously important to be able to measure these various dosages accurately, and there are such devices, but they are laboratory-type instruments which require a special reader or which require a special power supply to charge them and keep them charged.

The object of the present invention is to provide a radiochromic liquid which is particularly sensitive to low exposures of ionizing radiation and which can be encapsulated in a dosimeter and does not require a separate reader or power supply. Other objects and advantages will become apparent from the following description of the invention.

In accordance with our invention, we dissolve relatively large amounts of a hydrophobic amino triphenyl methane leucocyanide dye in a clear, highly polar organic solvent free of hydroxyl groups ultrasonically and add small amounts of acid to act as a sensitizer and stabilizer to make a radiochromic liquid which responds to ionizing radiation of less than 1000 rads in proportion to the integrated intensity of the exposure.

The leucocyanide dyes come as a crystalline powder and are described in U.S. Pat. Nos. 2,441,561; 2,528,496; 2,676,887; and 2,877,167. They can be dissolved in a monomer and then polymerized into a solid plastic or they can be dissolved in a suitable liquid medium and kept in solution. In either event, when they are exposed to ultraviolet or ionizing radiation, they change from the clear or "leuco" state into the colored state. In suitable conditions, the change is permanent. Even the crystalline powder will change color when exposed to ultraviolt or ionizing radiation, but it does this more slowly than when dissolved in solution or suitably incorporated into a polymer.

Prior to our invention, these dyes were believed to be of low radiation sensitivity and were used only to measure high doses of radiation, from about 1000 rads up to over 10 megarads.

The leucocyanide dyes for use in the present invention can be any hydrophobic, substituted aminotriphenyl methane leucocyanide dye. We prefer blue, violet, or green dyes because those colors can be discerned by most persons, that is, fewer persons are color-blind to them.

The preferred dyes are:
pararosaniline cyanide
hexa(hydroxyethyl) pararosaniline cyanide
new fuchsin cyanide
crystal violet cyanide.
Other suitable dyes are:
malachite green cyanide
brilliant blue cyanide
methyl green cyanide
helvetia green cyanide
seto-glaucine cyanide.

The leucocyanide dyes for use in accordance with the present invention may be represented by the following basic formula:

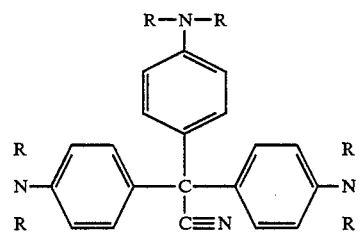

The R groups may be one of a hydrogen atom, an alkyl group of less than eight carbon atoms, such as methyl, ethyl, propyl, or butyl groups, or a hydroxyethyl group. The R groups may be the same or may be different in the positions shown in the formula.

The dyes are dissolved in a polar solvent, which should be substantially clear so that when the dye is dissolved, the solution is clear or at least has a minimum of background coloration. Preferably, the solvent should be free of hydroxy groups. The solvent should have a relatively high polarity of at least about 2 deBye units up to 5 or more deBye units. The high polarity solvents facilitate dissolving greater amounts of dye therein. Also, they seem to enhance the sensitivity of the dye in the color change reaction.

The solvents should stay liquid down to below at least about 20° C., and should not boil or vaporize at temperatures below about 80° C. They should be free of atoms which have atomic numbers greater than 17, which might impair sensitivity. Cost and availability are other obvious considerations.

The concentration of the dye in the polar solvent should be at least about 3 to 18 percent by weight, and preferably about 9 to 15 percent by weight, which in most instances is approaching or about at the saturation point. In millimolar measurements, these ranges work out to about 50 to 300 millimolar, and preferably 150 to 250 millimolar. We prefer, and try to obtain, relatively high concentrations of dye in the polar solvent.

The compounding and formulation must take place in a room which is filtered to keep out ultraviolet light and all other wavelengths of less than 4000 Angstroms. The dye solution must also be kept in containers which filter out ultraviolet light. Preferably, the solution is bubbled with nitrogen.

Means must be found to facilitate dissolution of the dyes in the solvent, because you are approaching the saturation limits of the dye in the solvent. The dyes cannot be heated in order to dissolve them in the solvent because the heat activates them and they tend to change to their colored state. They therefore have to be dissolved in the solvent in amounts which approach their saturation point by ultrasonic vibration. The powdered dye is poured into a beaker of solvent and the beaker subjected to ultrasonic vibration until, by visual inspection, one may determine that all of the dye has been dissolved in the solvent.

After the dye has been dissolved in the solvent, we add small amounts of an acid sensitizer and stabilizer. Acid sensitizes the dye so that it responds to the ionizing radiation and then, once it has responded and effected a color change, stabilizes the dye so that it does not revert back to the clear, colorless form.

When a solvent/dye system goes from clear to color as a result of radiation, it loses some of its acidity. One purpose of the acid is to make sure that the system stays on the acid side and that there are acid groups available for reaction with the dyes so that the color change is stabilized.

Suitable highly polar solvents are triethyl phosphate, dimethyl sulfoxide, dimethyl formamide, vinyl pyrollidone, tributyl phosphate, trioctyl phosphate, and trichloroethyl phosphate.

The preferred acid sensitizers and stabilizers are carboxylic acids, such as acetic acid, citric acid, and benzoic acid.

Other acids which we contemplate using in addition to those already mentioned are:
boric acid
phosphoric acid
tartaric acid
phthalic acid
salicylic acid
maleic acid.

The acids should dissolve in the solvent in which they are employed, and should be substantially free of water.

The amount of the acid should be enough to make the solution slightly acidic with a pH of 5 to 7 and stabilize the color change.

The following examples illustrate this aspect of our invention.

EXAMPLE I

From a stock supply of highly purified hexahydroxy ethyl pararosaniline cyanide dye, we weighed out accurately 7 g of dye, which was then placed into 100 ml of high purity or reagent grade triethyl phosphate in an amber-coated flask to filter actinic ultraviolet light. The dye was then ultrasonically dissolved until the solution was clear. To this was added 0.1 ml of glacial acetic acid, which resulted in soluton pH of 6. The solution was bubbled with nitrogen after the acid was added to eliminate gaseous oxidants within the mixture that could have confounding effects on the system.

The above solution was then irradiated with gamma rays from a cobalt 60 source to provide an exposure of 100 rads. The solution turned pale blue.

In accordance with a modification of our invention, we have discovered that we can dissolve an organic fluor or scintillator in an aromatic solvent, such as benzene, toluene, or xylene, dilute the aforesaid leucocyanide dye/polar solvent/organic acid solutions by up to one-half by volume, and still have an excellent, sensitive radiochromic liquid.

A wave shifting and concentration of radiant energy takes place so that, in this combination, a smaller amount of dye becomes just about as effective as a larger amount in the combination of the foregoing examples.

The aromatic solvent absorbs X-ray and gamma ray radiation, and emits radiation at around 3000 Angstrom wavelengths. The fluor, in turn, picks up the emissions from the aromatic solvent and emits photon energy in the 3000–3800 Angstrom wavelength range, which is a range to which the leucocyanide dyes are very sensitive. These photons, in turn, are absorbed by the leucocyanide dye in the polar solution to change its color.

The wavelengths at which the aromatic solvent and fluor absorb and emit radiation should be matched, bearing in mind that one is dealing with peaks and bands over which these materials act, and not precise numbers. Of course, the closer the peak at which the aromatic solvent emits is matched with the peak at which the fluor absorbs, and the like, the more efficient the system becomes.

Suitable fluors are those which absorb radiation at around 3000 Angstroms and emit at around 3850 Angstroms.

Suitable fluors are the various oligophenylenes, oxazoles, thiazoles, or oxadiazoles with two to six or more benzene rings such as PPO, PBD, PBBO, NPO, and NOPON and the like, in which P is used for phenyl, N for naphthyl, B for biphenyl, O for oxazole, and D for the oxadiazole group.

Suitable aromatic solvents are those which absorb radiation below 2000 Angstroms and emit at around 3000 Angstroms.

The fluor is dissolved in the aromatic solvent in amounts approaching the saturation point so as not to exceed the saturation point when mixed with the polar solvent.

EXAMPLE II 4 grams of hexahydroxyethyl pararosaniline cyanide dye was dissolved in 50 ml reagent grade triethyl phosphate ultrasonically. It was then acidified with 0.05 ml glacial acetic acid to give a pH of 6. 0.3 grams of PPO was dissolved in 50 ml reagent grade benzene. The two solutions were mixed together.

The mixed solution was then exposed to gamma rays from a cobalt 60 source to provide a total exposure of 100 rads.

The solution changed to a pale blue color determined by unaided visual observation. The color approached the intensity of that of Example I, which contained twice the amount of dye. Hexahydroxyethyl pararosaniline cyanide dye is the preferred dye because it is at the ultraviolet-blue end of the spectrum with narrower absorption ranges than some of the other red and green dyes.

In a still further modification of our invention, we can provide a polar solvent which also has an aromatic ring in it which responds to X-ray and gamma ray radiation like the aromatic solvent previously disclosed. To this solvent may be added a leucocyanide dye, an organic acid, and a fluor. The advantage of this system is that it eliminates the need for separate solvents for the dye and, for the fluor, provides an energy transfer means for direct photon activation of the dye, and solubilizes the dye. Such solvents may be less polar than otherwise preferred in order to incorporate the aromatic ring. In such cases, there should be at least 25 millimoles of dye in the solution.

Polar aromatic solvents for hydrophobic leucocyanide dyes possessing one or more aromatic groups may be a compound such as triphenyl phosphate, orthoxylene, phenol, and aminobenzene.

The action of the aromatic groups on the fluors is not wholly understood but is not the same as wave shifting as the term is conventionally employed. The ionizing radiation is high energy level radiation, which is believed to excite the aromatic groups, which in turn excite the fluors to emit radiation in the 2000 to 3900 Angstrom wavelength, which acts upon the leucocyanide dyes.

The dyes are thus made to respond both directly and indirectly to the ionizing radiation. Moreover, since the ionizing radiation is a more concentrated, faster traveling form of radiation and the dye is quite diluted, the interaction with the aromatic groups permits more of it to be captured and measured.

The compounds used in accordance with our invention should be free of impurities. The dyes, in particular, should be pure. Impurities in the dyes will give objectionable background coloration or flush. While the commercially available solvents, organic acids and secondary fluors are usually relatively pure and can often be used as is without additional purification, the purity of the ingredients in the system must be kept in mind. In working with these materials, one can never tell when an impurity will act as a screener or otherwise upset the response of the system.

We should note that solutions made in accordance with our invention respond to two general classes of radiation, namely, ultraviolet radiation, and radiation from gamma rays and X-rays and the like at the lower end of the spectrum which is also ionizing radiation. Ultraviolet radiation starts at 3900 Angstroms and goes down to perhaps 100 Angstroms, although more conventionally it is considered to be from 2000 to 3900 Angstroms. The ionizing radiation is in the range of from about 300 Angstroms down to 0.005 Angstroms.

Radiochromic solutions made in accordance with the present invention respond to photons or wavelengths between 0.005 Angstroms up to 3900 Angstroms by changing color, as is well known. For gamma and X-rays, these solutions respond to exposures of from about 20 rads up to 1000 rads. Depending upon the optical path length, they can also respond to exposures of less than 20 rads. The response to radiation is cumulative. If a person receives 100 rads one day and 300 rads the next day, the radiochromic dye solutions of the present invention give a response of 400 rads. In other words, radiochromic solutions made in accordance with the present invention respond in proportion to the integrated intensity of the exposure.

As should be apparent to those skilled in the art, there are a number of applications and uses for the radiochromic liquids of our invention. They can be suitably encapsulated in plastic tubes or ampoules or the like to make dosimeters and carried about by persons working with X-rays or gamma radiation. They can be made up in sealed ampoules with tissue or bone equivalencies and placed on or within a critical area of the human body in order to determine precise dosage for radiation therapy. Troops exposed to nuclear radiation can carry simple dosimeters having a solution made in accordance with our invention and, by noting color change alone in the field, will be able to estimate their exposure.

It will be understood that in accordance with the provisions of the patent statutes, variations and modifications of the compositions disclosed herein may be made without departing from the spirit and scope of the invention.

What is claimed is:

1. A radiochromic liquid for the measurement of ionizing radiation of less than 1000 rads comprising 100 parts by weight of a substantially colorless polar solvent which is free of hydroxyl groups, at least 50 millimoles of a hydrophobic substituted amino triphenyl methane leucocyanide dye dissolved in such solvent, said dye being in its colorless state, and enough acid dissolved in such solvent to make the solution slightly acidic with a pH of 5 to 7, said acid being substantially colorless and substantially free of water.

2. A radiochromic liquid in accordance with claim 1, in which the solvent is one of:
   triethyl phosphate,
   dimethyl sulfoxide,
   dimethyl formamide,
   2-ethoxy ethanol,
   vinyl pyrollidone;
   tributyl phosphate,
   trioctyl phosphate,
   trichloroethyl phosphate;
the dye is one of:
   pararosaniline cyanide,
   hexahydroxyethyl pararosaniline cyanide,
   new fuchsin cyanide,
   crystal violet cyanide,
   formyl violet cyanide,
   malachite green cyanide,
   brilliant blue cyanide,
   methyl green cyanide,
   helvetia green cyanide, and
   seto-glaucine cyanide;
and the acid is a carboxylic acid, there being from 150 to 250 millimoles dye in the solvent.

3. A radiochromic solution in accordance with claim 1, in which the solvent is triethyl phosphate and the dye is hexahydroxyethyl pararosaniline cyanide.

4. A radiochromic solution in accordance with claim 1, in which up to half of the solvent/dye solution by weight is replaced by a solution of an aromatic solvent and an organic fluor, the absorption and emission characteristics of said aromatic solvent and a fluor being matched to each other and to the dye so as to transform ionizing radiation into radiation above about 2000 Angstroms which is directly measured by the dye.

5. A radiochromic solution for the measurement of ionizing radiation of less than 1000 rads comprising at least 25 millimoles of a hydrophobic amino triphenyl methane leucocyanide dye, an organic polar solvent with an aromatic group which is free of hydroxyl groups, an organic fluor, and an acid, the dye and acid being dissolved in the solvent, there being enough acid to make the solution slightly acidic with a pH of 5 to 7, all ingredients being substantially colorless and free of water.

6. The radiochromic solution of claim 5, in which the solvent is triphenyl phosphate.

7. The radiochromic solution of claim 5, in which the solvent is orthoxylene.

8. A personnel dosimeter for the measurement of ionizing radiation of less than 1000 rads in which a radiochromic liquid in accordance with claim 2 above is suitably encapsulated so that the color change upon exposure to ionizing radiation can be detected by visual observation.

9. A personnel dosimeter for the measurement of ionizing radiation of less than 1000 rads in which a radiochromic liquid in accordance with claim 3 above is suitably encapsulated so that the color change upon exposure to ionizing radiation can be detected by visual observation.

10. A method of measuring ionizing radiation of less than 1000 rads in which any of the radiochromic liquid solutions of claim 2 above are suitably encapsulated and then exposed to such radiation, whereupon they become colored in proportion to the amount of radiation exposure whereby the amount of the radiation can be measured.

11. A method of measuring ionizing radiation of less than 1000 rads in which the radiochromic liquid solution of claim 3 is suitably encapsulated and then exposed to such radiation, whereupon it becomes colored in proportion to the amount of radiation exposure whereby the amount of the radiation can be measured.

* * * * *